United States Patent [19]

Schulte

[11] 4,284,479
[45] Aug. 18, 1981

[54] SEALING ARRANGEMENT FOR THE OVEN CHAMBER DOOR ON A COKING OVEN

[75] Inventor: Egon Schulte, Kirchhellen, Fed. Rep. of Germany

[73] Assignee: Didier Engineering GmbH, Essen, Fed. Rep. of Germany

[21] Appl. No.: 98,970

[22] Filed: Nov. 30, 1979

[30] Foreign Application Priority Data

Dec. 1, 1978 [DE] Fed. Rep. of Germany ....... 2852013

[51] Int. Cl.³ .............................................. C10B 25/16
[52] U.S. Cl. ................................. 202/248; 110/173 R
[58] Field of Search ................................ 202/248, 269; 110/173 R

[56] References Cited

U.S. PATENT DOCUMENTS

| | | | |
|---|---|---|---|
| 1,006,036 | 10/1911 | Wilputte | 202/248 |
| 1,504,661 | 8/1924 | Wertheim et al. | 110/173 R |
| 3,875,018 | 4/1975 | Calderon | 202/248 |
| 4,080,266 | 3/1978 | Dix | 202/248 |
| 4,176,013 | 11/1979 | Garthus et al. | 202/248 X |
| 4,189,457 | 2/1980 | Clement, Jr. | 202/269 X |

Primary Examiner—Frank W. Lutter
Assistant Examiner—Roger F. Phillips
Attorney, Agent, or Firm—Wood, Herron & Evans

[57] ABSTRACT

A sealing arrangement for a coking oven chamber is disclosed including a door selectively movable between opened and closed positions and a door frame surrounding the opening to the chamber. In the closed position, the door body faces the door frame and is spaced therefrom to define a sealing channel. A fluid sealing substance is injected into the channel through the door body while the door is closed. Inner and outer sealing strips may be provided on the door body to define the lateral confines of the sealing channel.

10 Claims, 6 Drawing Figures

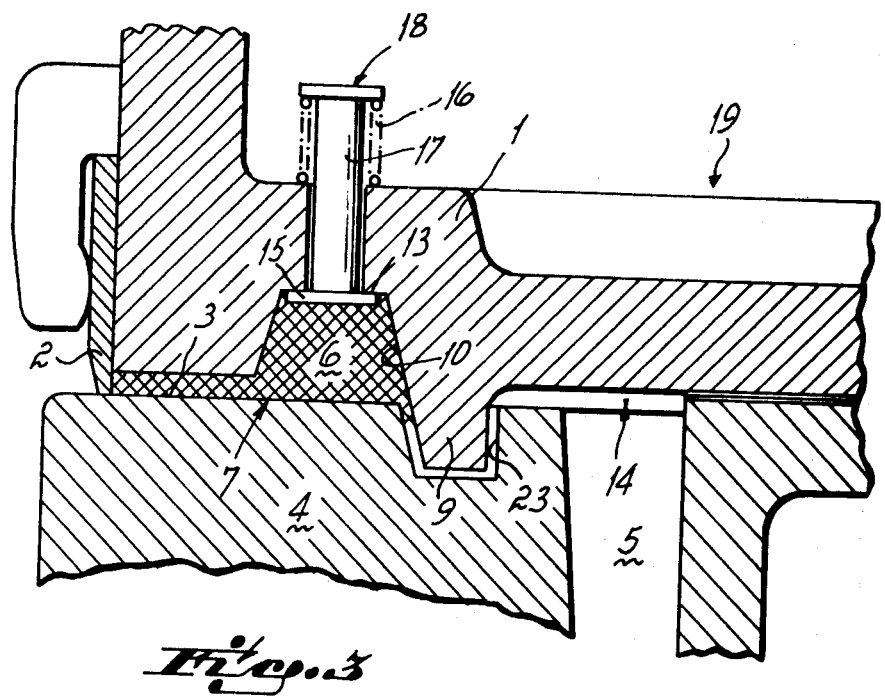
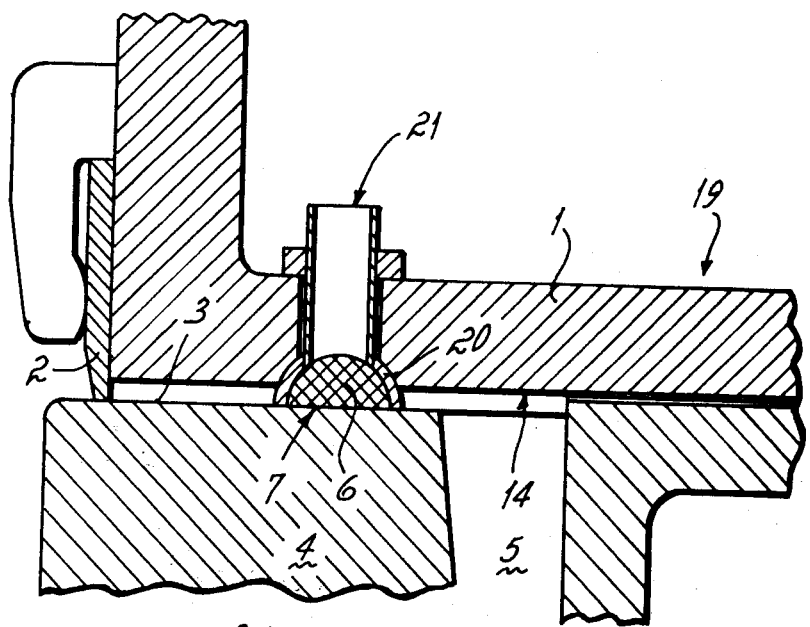

SEALING ARRANGEMENT FOR THE OVEN CHAMBER DOOR ON A COKING OVEN

BACKGROUND OF THE INVENTION

This invention relates to a sealing arrangement for the chamber door on a coking oven and, more particularly, to a sealing arrangement which provides a dependable gas-tight seal with simple means.

BRIEF DESCRIPTION OF THE INVENTION

It is among the principal objects of this invention to provide a continuous gas-tight seal between the inner peripheral edge of a door closing the coking oven chamber and the frame surrounding the opening to the coking oven chamber. To this end, the present invention provides a door body having an inner peripheral face which faces the door frame and is spaced therefrom when the door closes the opening to the coking oven chamber to provide a channel for receiving a fluid sealing substance. The fluid sealing substance is injected through the door body preferably at the bottom thereof and fills the channel with a homogenous, bubble-free sealing material which provides a hermetic seal for the oven chamber door on the coking oven in a relatively simple fashion.

The present invention contemplates several design alternatives of the sealing arrangement. For example, in one embodiment, one ore more sealing strips may be mounted on the door body which engage the door frame when the door is closed to define the lateral limits of the channel receiving the sealing material. An inner sealing strip may be provided or, alternatively, the inner edge of the sealing channel may be defined by a door body rim. In one presently preferred embodiment, a groove of generally trapezoidal cross-sectional configuration extends around the peripheral face of the door body. The sealing substance is injected into this groove through the door body. Further, means is provided for discharging the sealing substance from the groove, as desired.

In accordance with one embodiment of this invention, the sealing substance is injected into the channel by a high pressure eccentric worm pump. Use of such a pump offers the advantage of a completely homogeneous, bubble-free injection of the sealing substance into the sealing channel in continuous fashion. Moreover, it permits the reuse of the discharged substance after opening of the door thereby providing for continuous circulation of the sealing material further improving the homogeneity and bubble-free nature of the material injected into the channel.

Other objects and advantages of this invention will be apparent from the following detailed description of the invention, references being had to the accompanying drawings.

BRIEF DESCRIPTION OF THE DRAWINGS

FIGS. 2–4 are cross-sectional views similar to FIG. 1 illustrating three alternative embodiments of the sealing arrangement of the present invention.

FIG. 5b is a vertical section of the door shown in FIG. 5a.

DETAILED DESCRIPTION OF THE INVENTION

Figure 1:
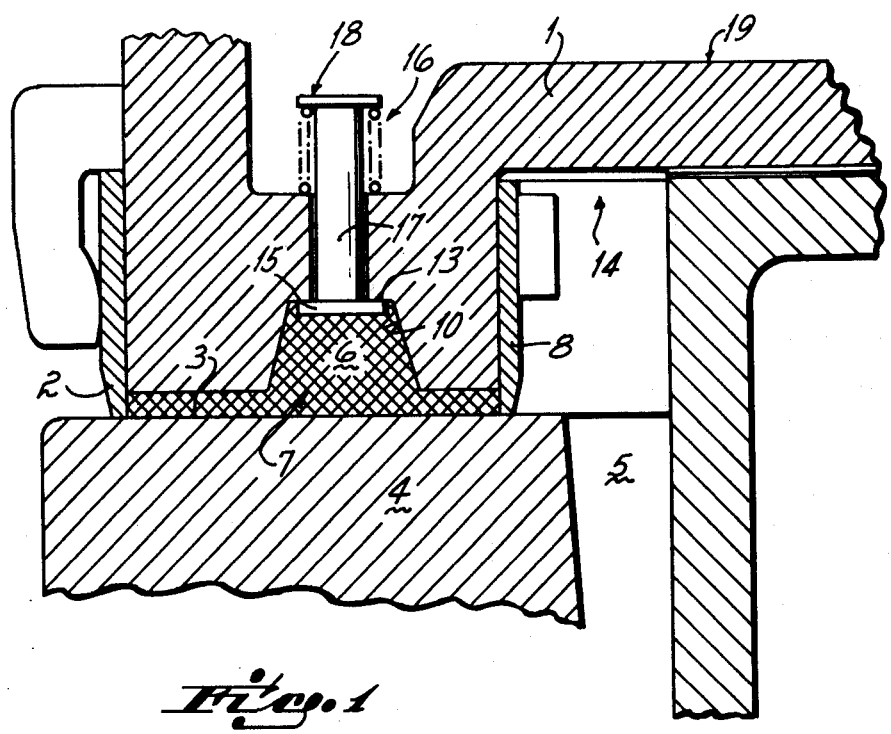
FIG. 1 is a cross-sectional view of the oven chamber door on a coking oven at one edge thereof.

Referring now to FIG. 1, the oven chamber door on a coking oven has a door body 1 on which is mounted an outer adjustable sealing strip 2 in conventional manner. The sealing strip 2 bears against the outer or sealing surface 3 of a door frame 4 surrounding the chamber opening 5 when the door body 1 is in a closed position. As shown in FIG. 1, a second sealing strip 8 is mounted on the door body 1 interiorly of the first sealing strip 2 and extends around the inside of the door body 1. This sealing strip 8 likewise bears against the sealing surface 3 of the door frame 4 which defines the door opening 5. The two sealing strips 2 and 8 which are mounted in spaced relation to each other define the lateral limits of a channel 7 extending around the door opening 5 between the door body 1 and the sealing surface 3. The channel 7 is adapted to be charged with a fluid sealing substance 6, for example, a mixture of loam and coking duff. The sealing material provides a simple and dependable hermetic seal between the door body 1 and the sealing surface 3 of the door frame 4.

In the embodiment shown in FIG. 1, the channel 7 includes a groove 10 in the peripheral face of the door body 1 which is generally of a trapezoidal, cross-sectional configuration. The long side of the trapezoid faces the sealing surface 3. Located in the bottom 13 of the groove 10 is a discharge platen 15. On the side of the discharge platen 15 facing the outside 19 of the door 1, there are located at spaced positions plungers 17 which extend through the door body 1. The outer end 18 of the plunger 17 is surrounded by a coil spring 16 which bears between the outside 19 of the door body 1 and the outer end 18 of the plunger 17. The respective discharge platen 15 is held thereby on the bottom 13 of the groove 10, but may be forced toward the inside 14 of the door against the force of the coil spring 16 to eject the sealing material from the groove 10 and for cleaning the channel 7 after the oven chamber door has been lifted off.

Figure 2:
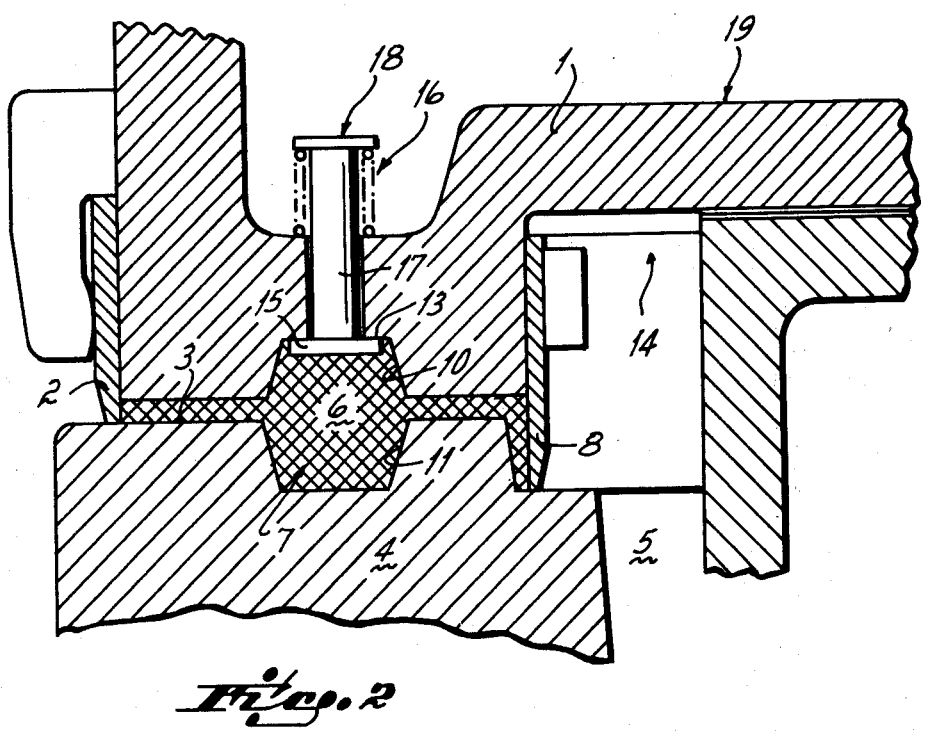

The embodiment illustrated in FIG. 2 is similar to that shown in FIG. 1 but includes a groove 11 in the door frame 4 opposing the groove 10 in the door body 1 to further improve the seal. A conventional frame cleaning machine may be employed in this case for cleaning the area 3 including the groove 11 after the oven chamber door had been lifted off. Further in this embodiment, the sealing strip 8 bears against a recessed portion of the sealing surface 3. The channel 7 is again laterally defined by the two sealing strips 2 and 8.

In the embodiment shown in FIG. 3, a protruding door body rim 9 replaces the inner sealing strip 8 of FIGS. 1 and 2. In this embodiment, the rim 9 protrudes into a recess 23 in the door frame 4. The channel 7 for receiving the sealing material 6 is thus defined by the outer sealing strip 2 and the inner door body rim 9.

In the embodiment shown in FIG. 4, the channel 7 is formed by half-tubes 20 whose open side faces the sealing surface 3 of the door frame 4 and bears against it in the door closed position. The half-tubes 20 are supported by plungers 21 spaced in the door body 1 forcing the half-tubes 20 on the sealing surface 3. Between successive uses, the half-tubes 20 may be cleaned with automatic scrapers.

Figure 5A:
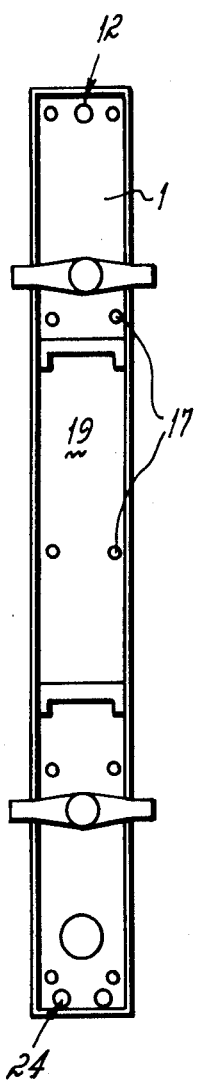
FIG. 5a is an elevational view of the oven chamber door of the present invention.
Figure 5B:
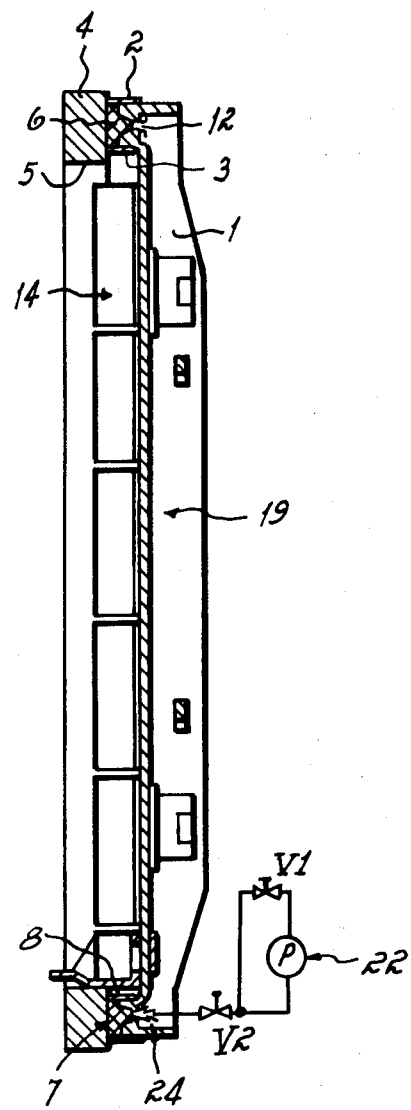

Referring now to FIG. 5, it can be seen that the channel 7 has an overflow channel 12 at the highest point of the door body 1. The sealing material 6 is injected into the channel 7 without bubbles through two injection openings 24 located at the bottom of the door body 1 by means of a feeding device 22. The seal is complete when the sealing material 6 issues out of the upper overflow channel 12. The feeding device 22 includes a high pressure eccentric worm pump P which is connected to the openings 24. The material flow may be either passed into the channel 7 either by means of valve V1 or V2 or circulated to improve the homogeneity of the sealing material. In this connection, the present invention admits of continuously circulating the sealing material between uses, that is, discharged spent material upon completion of its use as a sealing material is returned to the feed device 22, for example, by a return blade and dressing machine such as a sifter. Continuous circulation of the sealing material further improves its properties with regard to homogeneity and absence of bubbles.

Experience with the sealing arrangement of the present invention has shown that the sealing process takes only a few minutes. Moreover, the cleaning of the sealing channel poses no difficulties, and for cleaning highly pressurized water may be employed in well known fashion.

Although the invention has been described in terms of certain preferred embodiments, it will be recognized that other forms may be adopted within the scope of the invention.

I claim:

1. A door for selectively opening and closing the opening to a coking over chamber comprising a door body adapted to face a door frame surrounding said opening to said chamber about a peripheral portion of said door body in the door closed position, inner and outer sealing strips mounted on said door body, at least said outer sealing strip resiliently engaging said door frame when said door is closed, said inner and outer sealing strips, said door frame and said facing peripheral portion of said door body defining therebetween a channel, and means for injecting a sealing substance into said channel while said door body is in said door closed position to provide a seal between said door body and said door frame.

2. The door of claim 1 wherein both said inner and outer sealing strips mounted on said door body resiliently engage said door frame when said door is in the door closed position.

3. The door of claim 1 wherein said channel is laterally defined by said outer sealing strip mounted on said door body and an inner door body rim protruding into a recess in said door frame.

4. The door of claim 1 further including a groove of generally trapezoidal, cross-sectional configuration extending about the peripheral portion of said door body facing said door frame, said channel including said groove.

5. The door of claim 4 wherein said door frame includes a groove of generally trapezoidal, cross-sectional configuration in said door frame opposite said groove in said door body, said channel including both said grooves.

6. The door of claim 4 further comprising means mounted in said door body for ejecting said fluid sealing substance from said groove, said means being actuable from the outside of said door body.

7. The door of claim 6 wherein said ejection means comprises a plunger extending through said door body into said groove, a platen mounted on the end of said plunger, and spring means biasing said plunger in an outward direction, said spring means permitting inward movement of said plunger on application of a force exceeding the force of said spring whereby said platen ejects said sealing substance from said groove and whereby said spring returns said plunger to its outward position on release of said overcoming force.

8. The door of claim 1 further including an overflow channel at the uppermost point of said channel and communicating therewith and wherein said means for injecting a fluid sealing substance into said channel comprises a high pressure eccentric worm pump connected to said channel at a point below said overflow channel.

9. The door of claim 1 wherein said inner and outer sealing strips are formed by half-tubes having the walls thereof bearing on said door frame, said half-tubes being supported by said door body at the peripheral portion thereof.

10. The door of claim 9 wherein said half-tubes are supported by hold down plungers mounted in the door body.

* * * * *

UNITED STATES PATENT AND TRADEMARK OFFICE
CERTIFICATE OF CORRECTION

PATENT NO. : 4,284,479

DATED : August 18, 1981

INVENTOR(S) : Egon Schulte

It is certified that error appears in the above—identified patent and that said Letters Patent is hereby corrected as shown below:

In column 1, line 30, "ore" should be --or--.

In column 3, line 31, "over" should be --oven--.

Signed and Sealed this

Twenty-seventh Day of October 1981

[SEAL]

Attest:

GERALD J. MOSSINGHOFF

Attesting Officer     Commissioner of Patents and Trademarks